Feb. 23, 1932.   L. M. BUZZELL   1,846,308
KITCHEN UTENSIL
Filed Feb. 9, 1931

INVENTOR.
Laura M. Buzzell
BY
Harry C. Schroeder
ATTORNEY

Patented Feb. 23, 1932

1,846,308

UNITED STATES PATENT OFFICE

LEURA M. BUZZELL, OF OAKLAND, CALIFORNIA

KITCHEN UTENSIL

Application filed February 9, 1931. Serial No. 514,536.

This invention is for a kitchen utensil, and has special reference to a utensil adapted mainly to baking purposes.

The main object of the invention is to provide a kitchen utensil especially adapted to the inspection of foods and handling of the containers therefor in an oven whereby the foods may be inspected without removing them from the oven and may be conveniently removed from the oven.

Another object of the invention is to provide a utensil as described by which pans may be shifted about within an oven, inserted or removed therefrom, and contents inspected without danger to the operator, such as burnt hands or arms.

A further object of the invention is to provide an automatically clamped adjustable pan lifter with an electric light, and a combined reflector and heat deflector.

The invention is adequately illustrated in the accompanying drawings in which

Figure 1:
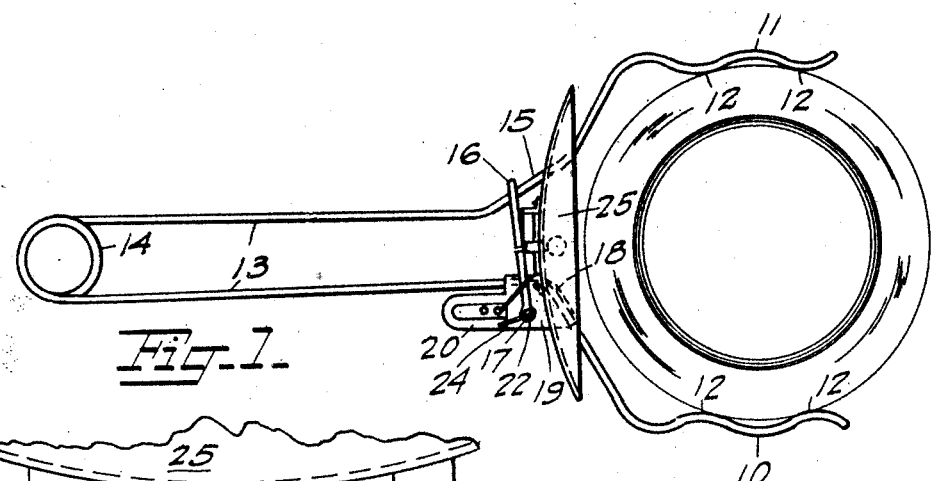
Fig. 1 is a top plan view of the invention.
Figure 5:
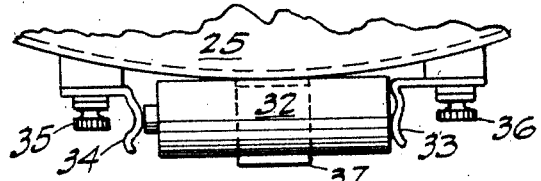
Fig. 5 is an enlarged detail of the battery mounting.
Figure 2:
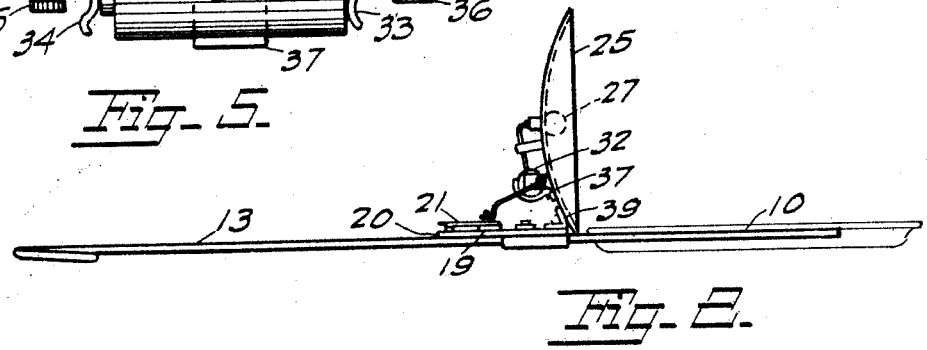
Fig. 2 is a side elevation showing a pie pan supported at the rim.
Figures 3, 4:
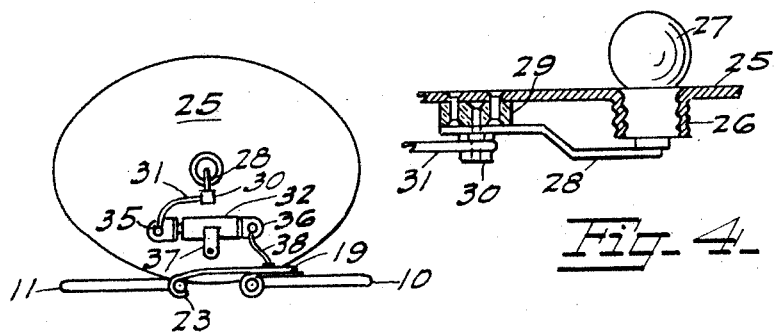
Fig. 3 is a rear elevation with the handle removed.
Fig. 4 is an enlarged section showing the lamp mounting.

The invention consists primarily of a pan lifter formed of wire and resiliently expanded, a hinged link member cooperating with the handle members for retaining the tongs in operative position, a shield secured to one handle member and vertically disposed acting both as a reflector for an electric light, and as a deflector or baffle to prevent the heat from the oven striking the hand, a lamp mounted in the reflector, a battery and a switch for the lamp.

Similar reference characters identify identical parts in the several views.

The invention consists of a pair of resiliently expanded tongs 10 and 11 formed with two contacting surfaces 12 so as to grip a pan at four points, and adapted to handle pans of various diameters, the tongs terminating in handle members 13 which terminate in a spiral 14 to provide the required resiliency for expanding the tongs. The tongs are similarly formed except at the coincidence with the handle members, tong 11 being so formed at 15 that a link 16 swung about the pivot 17 in the direction of the tongs will retain the tongs in adjusted position, and tong 12 being merely bent back at 18 to form the handle member 13. Secured by curling about the wire at the bend 18 is a plate or bracket 19 having a rearward extension 20 and forming a mounting for the link 16 and a switch 21.

The link 16 consists of a length of wire flattened at one end and provided with an aperture for a pivot 22, the opposite end being curled as at 23 to cooperate with the portion 15 of tong 11. A spring 24 urges the link 16 forward causing it to engage the portion 15 as the handle members 13 are retracted, retaining them in the adjusted position until drawn back.

The reflector 25 is preferably of oval shape so as to protect the hand against the hot air currents coming out of the oven and has a socket 26 formed at the center to receive a flash light lamp 27 therein. A spring contact 28 cooperates with the center contact of the lamp base and is insulated from the reflector 25 by a block of insulating material 29 and has a terminal 30 for a wire connection 31. A battery 32 is retained between spring contacts 33 and 34 which are mounted on and insulated from the reflector 25, and provided with terminals 35 and 36, a body clip 37 securely retaining the battery in position.

The switch may be of any standard flash light type of switch or may be made as indicated, in which a spring member 21 is insulated from the bracket extension 20 and adapted, by depression, to make contact with extension 20.

A wire 31 connects the center terminal of lamp 27 with terminal 35 of battery 32, another wire 38 connecting from the opposite battery terminal 36 to switch 21, the balance of the circuit being completed through the bracket 19 and reflector 25, the reflector being secured to bracket 19 by a clip 39.

The operation of the device is as follows.

Link 16 is drawn back, permitting the tongs to spread. The tongs are then spanned over the sides of the pan and retracted by compressing the members 13 of the handle. This movement permits the spring 21 to force link 16 forward along portion 15 of the tong 11, retaining the tongs in the retracted position. If it is desired to inspect foods in the oven, it merely requires operation of the switch 21, lighting lamp 27, the reflector also acting as a guard against the heat waves from the oven striking the hand.

It will be noted that variations in construction and arrangement of parts which are consistent with the appended claim may be resorted to without detracting from the spirit or scope of the invention or sacrificing any of the advantages thereof.

I claim:

A household utensil, in combination, a pair of resiliently expanded pan lifting tongs having each, two spaced apart contact points for cooperation with the rim of a pan, an integral handle, and a resiliently urged link having one end pivotally secured to one handle member, the opposite end thereof encompassing the other handle member, said other handle member having a cooperating portion formed diagonally for adjustable engagement of said link therewith.

In testimony whereof I have affixed my signature.

LEURA M. BUZZELL.